(12) United States Patent
Borchardt

(10) Patent No.: US 12,334,778 B2
(45) Date of Patent: Jun. 17, 2025

(54) ROTOR FOR A PERMANENTLY ENERGIZED ELECTRICAL MACHINE, WITH A SUPPORT STRUCTURE

(71) Applicant: Bayerische Motoren Werke Aktiengesellschaft, Munich (DE)

(72) Inventor: Norman Borchardt, Oberschleissheim (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 481 days.

(21) Appl. No.: 17/418,902

(22) PCT Filed: Feb. 5, 2020

(86) PCT No.: PCT/EP2020/052797
§ 371 (c)(1),
(2) Date: Jun. 28, 2021

(87) PCT Pub. No.: WO2020/177964
PCT Pub. Date: Sep. 10, 2020

(65) Prior Publication Data
US 2022/0123612 A1      Apr. 21, 2022

(30) Foreign Application Priority Data

Mar. 5, 2019   (DE) ..................... 10 2019 105 570.9

(51) Int. Cl.
*H02K 1/274*      (2022.01)
*H02K 1/02*       (2006.01)
(Continued)

(52) U.S. Cl.
CPC ............. *H02K 1/2773* (2013.01); *H02K 1/02* (2013.01); *H02K 2201/03* (2013.01)

(58) Field of Classification Search
CPC .... H02K 1/02; H02K 2201/03; H02K 1/2733; H02K 21/14; H02K 1/2746; H02K 1/274; H02K 1/27
(Continued)

(56) References Cited

U.S. PATENT DOCUMENTS 5,672,926 A * 9/1997 Brandes ............... H02K 21/042
174/DIG. 20
6,177,745 B1 * 1/2001 Narita .................. H02K 1/2766
310/156.43

(Continued)

FOREIGN PATENT DOCUMENTS

CN      106849579 A      6/2017
CN      107994703 A      5/2018
(Continued)

OTHER PUBLICATIONS

Chinese-language Office Action issued in Chinese Application No. 202080006845.5 dated May 6, 2023 with English translation (20 pages).

(Continued)

*Primary Examiner* — Burton S Mullins
(74) *Attorney, Agent, or Firm* — Crowell & Moring LLP

(57) ABSTRACT

A rotor for a permanently energized electrical machine includes at least two rotor poles arranged next to one another in the circumferential direction; a rotor iron core; and a permanent magnet assembly embedded in the rotor iron core for generating a magnetic air-gap flux density, the assembly having at least one permanent magnet per rotor pole and the permanent magnet being divided into at least two permanent magnet parts. A crosspiece is arranged between the at least two permanent magnet parts of a permanent magnet the crosspiece separates two hollow spaces for receiving the permanent magnet parts, has magnetically conductive support sections for increasing a mechanical stiffness of the (Continued)

rotor iron core and for discharging external magnetic fluxes in the event of an active short circuit introduced into the electrical machine, and has magnetically insulating flux-blocking sections for reducing magnetic leakage fluxes.

8 Claims, 1 Drawing Sheet

(51) Int. Cl.
    *H02K 1/27* (2022.01)
    *H02K 1/276* (2022.01)
    *H02K 21/14* (2006.01)

(58) Field of Classification Search
    USPC ........................................ 310/156.53, 156.56
    See application file for complete search history.

(56) References Cited

U.S. PATENT DOCUMENTS

| | | | |
|---|---|---|---|
| 6,274,960 B1 * | 8/2001 | Sakai ................ | H02K 1/246 |
| | | | 310/168 |
| 7,768,172 B2 * | 8/2010 | Takahata ............. | H02K 1/276 |
| | | | 310/156.56 |
| 9,369,012 B2 * | 6/2016 | Hattori .................... | H02K 1/27 |
| 9,502,932 B2 * | 11/2016 | Date ....................... | H02K 1/274 |
| 10,608,487 B2 * | 3/2020 | Liang .................... | H02K 1/2766 |
| 10,797,546 B2 * | 10/2020 | Lee ....................... | H02K 1/2766 |
| 11,456,633 B2 * | 9/2022 | Takahashi ............. | H02K 1/276 |
| 12,191,713 B2 * | 1/2025 | Hisada .................. | H02K 1/276 |
| 2008/0224558 A1 | 9/2008 | Ionel | |
| 2009/0224624 A1 | 9/2009 | Kumar et al. | |
| 2014/0070655 A1 | 3/2014 | Schneider et al. | |
| 2017/0085142 A1 | 3/2017 | Murota et al. | |
| 2017/0294813 A1 | 10/2017 | Lim et al. | |
| 2018/0342916 A1 | 11/2018 | Krizan et al. | |
| 2019/0027983 A1 | 1/2019 | Michaelides et al. | |
| 2020/0244121 A1 * | 7/2020 | Takahashi ............. | H02K 15/03 |

FOREIGN PATENT DOCUMENTS

| | | | | |
|---|---|---|---|---|
| DE | 10 2014 219 231 A1 | 4/2015 | | |
| DE | 10 2016 209 711 A1 | 1/2018 | | |
| DE | 102016711 | * 1/2018 | ............... | H02K 1/27 |
| DE | 11 2016 006 224 T5 | 9/2018 | | |
| DE | 10 2018 111 956 A1 | 11/2018 | | |
| EP | 2 709 238 A1 | 3/2014 | | |
| JP | 2001-286110 A | 10/2001 | | |
| JP | 2006-50820 A | 2/2006 | | |
| JP | 2010-130859 A | 6/2010 | | |
| JP | 2011-15484 A | 1/2011 | | |
| JP | 2012-80607 A | 4/2012 | | |
| JP | 2013-121262 A | 6/2013 | | |
| JP | 2014039475 A | * 2/2014 | ............... | H02K 1/27 |
| JP | 2014-90575 A | 5/2014 | | |
| JP | 2014-107907 A | 6/2014 | | |
| JP | 2018-46590 A | 3/2018 | | |
| JP | 2018046703 A | * 3/2018 | ............... | H02K 1/27 |
| JP | 2020188585 | * 11/2020 | ............... | H02K 1/27 |
| WO | WO 2011/002043 A1 | 1/2011 | | |
| WO | WO 2017/221521 A1 | 12/2017 | | |
| WO | WO 2018/099541 A1 | 6/2018 | | |
| WO | WO 2019026932 A1 | * 2/2019 | ............... | H02K 1/27 |

OTHER PUBLICATIONS

International Search Report (PCT/ISA/210) issued in PCT Application No. PCT/EP2020/052797 dated Apr. 15, 2020 with English translation (five (5) pages).

German-language Written Opinion (PCT/ISA/237) issued in PCT Application No. PCT/EP2020/052797 dated Apr. 15, 2020 (five (5) pages).

German-language Search Report issued in German Application No. 10 2019 105 570.9 dated Jun. 9, 2021 with partial English translation (12 pages).

* cited by examiner

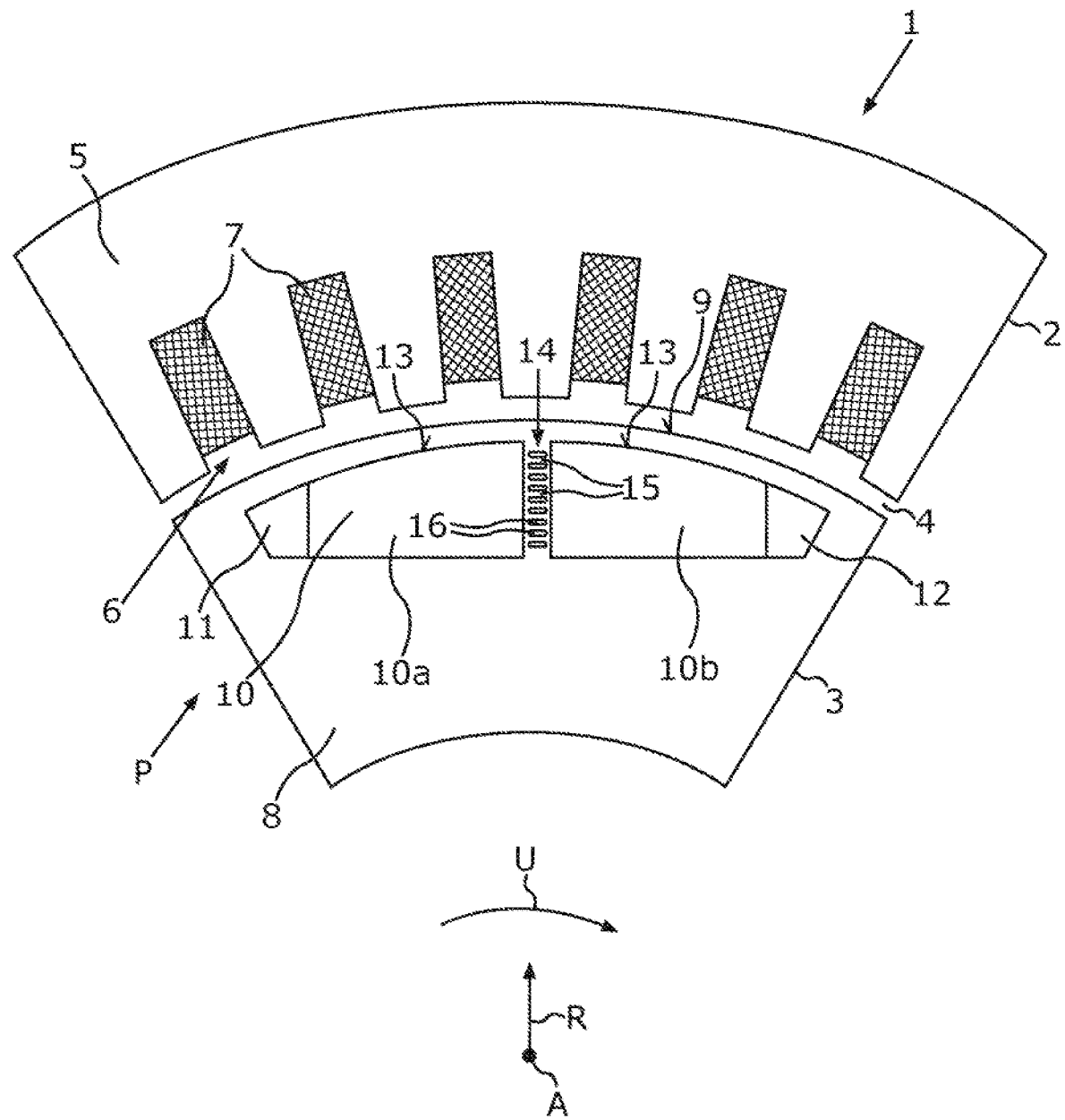

ROTOR FOR A PERMANENTLY ENERGIZED ELECTRICAL MACHINE, WITH A SUPPORT STRUCTURE

BACKGROUND AND SUMMARY OF THE INVENTION

The invention relates to a rotor for a permanently energized electrical machine, the rotor comprising at least two rotor poles arranged next to one another in the circumferential direction. The rotor has a rotor iron core and a permanent magnet assembly embedded in the rotor iron core for producing a magnetic air gap flux density in an air gap of the electrical machine which adjoins the outer side of the rotor iron core. The permanent magnet assembly has at least one permanent magnet per rotor pole, the permeant magnet being divided into two permanent magnet parts. The invention also relates to a permanently energized electrical machine and a motor vehicle.

In the present case, interest is directed to permanently energized electrical machines for motor vehicles. Such machines can be used, for example, as drive machines for electrically driven motor vehicles, i.e. electric or hybrid vehicles. Permanently energized electrical machines have a stator supported in a fixed position with energizable stator windings and a rotor having a permanent magnet assembly that is rotatably mounted with respect to the stator. The permanent magnet assembly can have, for example, surface magnets, which are arranged on an outer side of a rotor iron core of the rotor, or embedded or buried permanent magnets, which are arranged in hollow spaces in the rotor iron core.

A dimension, in particular a width, of embedded permanent magnets is largely determined by a supporting action of the rotor iron core. In high-speed rotors, a horizontal, tangential arrangement of the permanent magnets is often not selected, since the rigidity of the rotor iron core is not sufficient to support the permanent magnets appropriately, which means that breakage of one of the permanent magnets can occur. In order to prevent this, the permanent magnets can firstly be arranged in a V arrangement. However, the result of this is that with identical permanent magnet dimensions, a resultant torque is lower because of a lower magnetic flux density in the air gap. Secondly, the permanent magnets can be divided into permanent magnet parts and separated from one another by a hollow space filled with air or an air bar or by a solid iron bar made of rotor iron core material. Solid iron bars between the permanent magnet parts cause an increase in magnetic leakage fluxes in the rotor iron core material, however, and thus a reduction in the torque. In order to compensate for this torque loss, it would be necessary for the permanent magnets to be formed with more magnetic material, which results in higher costs and a higher mass moment of inertia. As a result, the economy and the dynamic properties, such as the acceleration capacity, of the electrical machine are negatively influenced. Although air bars between the permanent magnet parts lead to a reduction in the magnetic leakage fluxes, the result is that magnetic fluxes or field strengths can be discharged only inadequately in the event of an active short-circuit introduced into the electrical machine. In addition, air bars cause a detrimental distribution of mechanical stresses in the rotor iron core.

It is an object of the present invention to provide a particularly simply implementable solution to providing a low leakage flux and simultaneously stable rotor for a permanently energized electrical machine which, in addition, is able to discharge magnetic fluxes in the event of an active short circuit.

This object is achieved by a rotor, a permanently energized electrical machine and a motor vehicle having the features according to the claimed invention.

A rotor according to embodiments of the invention for a permanently energized electrical machine comprises at least two magnetic rotor poles arranged next to one another in the circumferential direction. The rotor has a rotor iron core and a permanent magnet assembly embedded in the rotor iron core for producing a magnetic air gap flux density in an air gap of the electrical machine which adjoins the outer side of the rotor iron core. The permanent magnet assembly has at least one permanent magnet per rotor pole, the permanent magnet being divided into at least two permanent magnet parts. A crosspiece is arranged between the at least two permanent magnet parts of a permanent magnet, which crosspiece separates at least two hollow spaces for receiving the permanent magnet parts and therefore the permanent magnet parts of a permanent magnet that are arranged in the hollow spaces. The crosspiece has magnetically conductive support sections for increasing mechanical stiffness of the rotor iron core and for discharging external magnetic fluxes in the event of an active short-circuit introduced into the electrical machine. In addition, the crosspiece has magnetically insulating flux-blocking sections for reducing magnetic leakage fluxes.

The invention additionally relates to a permanently energized electrical machine comprising a stator and a rotor according to the invention that is rotatably mounted with respect to the stator, wherein an air gap is formed between the rotor and the stator. The air gap is therefore located along a radial direction between the rotor and the stator.

The electrical machine can be used, for example, as a traction machine for an electrically driven motor vehicle. The electrical machine is in particular an internal rotor machine. The electrical machine has the stator, which has a stator iron core or stator laminations having grooves arranged so as to be distributed in the circumferential direction. Energizable stator windings are arranged in the grooves, which face the air gap between the stator and rotor. In the case of the permanently energized internal rotor machine, the stator laminations are hollow-cylindrical, wherein the rotor is rotatably mounted in an internal space that is enclosed by the hollow-cylindrical stator laminations. The air gap is formed between the outer side of the rotor iron core and an inner side of the stator which faces the internal space and has the grooves.

The rotor iron core or rotor laminations is/are in particular likewise hollow-cylindrical and have an inner side facing the axis of rotation and the outer side facing the air gap. The inner side encloses a rotor shaft which extends axially along the axis of rotation and which is co-rotationally connected to the rotor. The rotor has at least two magnetic rotor poles, wherein each rotor pole is assigned one sector of the rotor iron core. Two adjacent rotor poles in the form of a south pole and a north pole form a rotor pole pair. At least one permanent magnet is arranged in each sector. The permanent magnets of the rotor poles are divided and buried or embedded permanent magnets. To this end, a hollow space, which extends axially through the rotor iron core and in which the permanent magnet part is arranged, is formed in the rotor iron core for each permanent magnet part of a permanent magnet. Rotor iron core material is located in the radial direction between a respective hollow space and the outer side of the rotor iron core that faces the air gap, and therefore between the permanent magnet part arranged in the hollow space and the air gap. This rotor iron core material forms respective bridges in the radial direction over the permanent magnet parts and above the permanent magnet parts, which extend along the circumferential direction. Via these bridges, the magnetic fluxes of the permanent magnet part are conducted between the air gap, the permanent magnet parts and the stator and generate the air gap flux density in the air gap of the electrical machine.

A crosspiece, which separates the two hollow spaces of the permanent magnet parts from one another and which extends substantially in the radial direction, is respectively located in the circumferential direction between two permanent magnet parts of a magnetic rotor pole. A width of the crosspiece in the circumferential direction is in particular considerably smaller than a width of the permanent magnet parts. A length of the crosspiece in the radial direction corresponds in particular to a radial height of the hollow spaces adjoining the crosspiece. This crosspiece is provided firstly to ensure the mechanical stiffness of the permanently energized electrical machine in the event of elastic deformations, which occur in particular at higher rotational speeds of the electrical machine, and to discharge external magnetic fluxes and magnetic field strengths in the event of an active short circuit (ASC).

An active short-circuit can be caused specifically to avoid damage in the event of excessively high electric voltages on the electrical machine, and thus to provide a safe operating mode for the electrical machine. For example, connecting leads can be short-circuited by way of an inverter connected upstream of the electrical machine in order to perform the active short circuit. However, during such an active short-circuit, magnetic fluxes and field strengths, which could penetrate and therefore demagnetize the permanent magnet parts, can be introduced into the rotor iron core by the stator winding. In order to conduct these magnetic field strengths past the permanent magnet parts and therefore to discharge them, the crosspiece has a support structure made of the magnetically conductive support sections, which additionally increases stability of the rotor iron core. This support structure therefore advantageously permits greater elastic deformations at higher rotational speeds of the rotor under load, so that, in particular, large-volume permanent magnet parts can be used. In addition, as a result of such a support structure, the result is configuration freedom with regard to the possible arrangements of the permanent magnet parts in the laminations, which enables targeted optimization, for example with regard to dimensions and shapes of the permanent magnet parts.

On the other hand, the crosspiece is provided to reduce magnetic leakage fluxes which arise in particular at the edges of the permanent magnet parts. Magnetic leakage fluxes can superimpose harmonic waves on useful torque-forming, sinusoidal basic harmonics of the air gap flux density, which leakage fluxes are responsible for an additional power loss in the rotor iron core and therefore additional heating of the electrical machine. In addition, the harmonic waves cause additional ripple or irregularities in the torque. To reduce the magnetic leakage fluxes, the crosspiece has a magnetic flux-blocking structure made of the magnetically insulating flux-blocking sections. The magnetic flux-blocking sections have a considerably higher reluctance as compared with the magnetically conductive support sections and a considerably higher magnetic resistance. Preferably, the magnetic flux-blocking sections are additionally also electrically insulating. The magnetic flux-blocking sections act as barriers for the magnetic leakage flux. As a result of the magnetic flux-blocking sections, the magnetic leakage fluxes can be controlled specifically, the result of which is that, as compared with a structure with a solid iron bar, a torque yield is improved and torque ripples are reduced.

The mechanical support structure and the magnetic flux blocking structure, of which the crosspiece consists, thus form an electromagnetic-mechanical structure in the rotor iron core, by use of which, advantageously, both a mechanical force flow and an electromagnetic flux can be controlled specifically to provide a low-loss and stable electrical machine.

In particular, the permanent magnet parts are oriented tangentially with respect to an axis of rotation of the rotor and arranged horizontally next to one another. A magnetic longitudinal axis of the permanent magnet parts is therefore oriented tangentially to the axis of rotation and tangentially to the outer side of the rotor iron core. A magnetization direction of the permanent magnet parts is in particular oriented at right angles to the magnetic longitudinal axis. The permanent magnet parts are arranged lying horizontally next to one another, at an angle of 180°. The crosspiece extending in the radial direction has in particular a constant width over its radial length. This horizontal arrangement of the permanent magnet parts, which, in particular at higher rotational speeds of the electrical machine, requires high mechanical stability of the rotor iron core, is possible on account of the support structure of the crosspiece which improves a supporting action of the rotor iron core. Such a horizontal arrangement of the permanent magnet parts, as compared with a V arrangement with an angle of less than 180°, results in a higher magnetic air gap flux density in the air gap and therefore to a higher torque.

It proves to be advantageous if surfaces of the permanent magnet parts which face the outer side of the rotor iron core are curved convexly, and the hollow spaces have a concavely curved inner side corresponding to the convexly curved surface. The concave surface of the permanent magnet parts is, for example, arranged so as to rest on the concave inner side of the hollow space. As a result of the concave inner side of the hollow space, which in particular extends parallel to the outer side of the rotor iron core, the bridges between the hollow spaces and the outer side of the rotor iron core are arcuate and have a constant radial thickness in the circumferential direction. This shape of the permanent magnets advantageously benefits the desired sinusoidal shape of the basic harmonics of the magnetic air gap flux density profile.

Particularly preferably, the magnetic flux-blocking sections are formed as cavities in the rotor iron core, and the support sections are formed as rotor iron core material adjacent to the cavities. The magnetically insulating flux-blocking structure is therefore formed as a cavity structure. The crosspiece sections made of rotor iron core material form the support structure which, in the event of the active short-circuit, partly conducts the outer magnetic field strengths past the permanent magnet parts. The crosspiece is therefore formed in some regions as an air bar by the cavities, and in some regions as a solid iron bar by the sections of rotor iron core material. Therefore, the advantages of the solid iron bar, which increases the mechanical stiffness and discharges external magnetic fluxes in the event of an ASC, and of the air bar, which reduces magnetic leakage fluxes in the rotor iron core, are combined. In addition, magnetic flux-blocking sections formed as cavities can be produced particularly simply in the rotor iron core. Furthermore, these cavities cause a beneficial distribution of mechanical stresses in the rotor iron core and reduce a volume and a weight of the rotor iron core. In this way, costs can advantageously be saved. In addition, the cavity structure can advantageously be used for the active or passive cooling of the rotor.

In particular, the magnetic flux-blocking sections, for example the cavities, are arranged at a distance from one another in the radial direction, so that magnetic flux-blocking sections and mechanical support sections are arranged alternately in the radial direction in the crosspiece. The magnetic flux-blocking sections can, for example, be spaced apart equidistantly or non-equidistantly from one another. The magnetic flux-blocking sections can additionally have different or identical geometries or shapes.

Provision can also be made for the cavities to be filled with electrically and magnetically insulating supporting material to further increase mechanical stability of the rotor iron core. Such a supporting material can be a plastic, for example. By way of such a supporting material, the mechanical stiffness of the rotor can be increased further without increasing the magnetic leakage fluxes in the rotor iron core in the process.

The invention also includes a motor vehicle comprising a permanently energized electrical machine according to the invention. The motor vehicle is in particular an electric or hybrid vehicle and has the electrical machine as an electrical traction machine or drive machine.

The embodiments and advantages thereof presented with reference to the rotor according to the invention apply in a corresponding way to the electrical machine according to the invention and to the motor vehicle according to the invention.

Further features of the invention emerge from the claims, the FIGURE and the FIGURE description. The features and feature combinations recited above in the description and the features and feature combinations recited below in the FIGURE description and/or shown on their own in the FIGURE can be used not only in the respectively specified combination but also in other combinations or on their own.

The invention will now be explained in more detail by using a preferred exemplary embodiment and with reference to the drawing.

BRIEF DESCRIPTION OF THE DRAWING

FIG. 1 shows a schematic sectional illustration of a sector of an embodiment of an electrical machine.

DETAILED DESCRIPTION OF THE DRAWING

The permanently energized electrical machine 1 shown in FIG. 1 can be formed, for example, as an electrical traction machine of an electrically driven motor vehicle, not shown here. The electrical machine 1 comprises a stator 2 and a rotor 3 mounted with respect to the stator 2 such that it can rotate about an axis of rotation A. The stator 2 and the rotor 3 are arranged at a distance from each other, forming an air gap 4. The stator 2 has stator laminations 5 having a multiplicity of grooves 6 distributed in the circumferential direction U, in which energizable windings 7 of the stator 2 for producing a rotating field are arranged. By way of this rotating field, the stator 3 can be energized to rotate about the axis of rotation A.

The rotor 3 has at least two rotor poles P, here a rotor pole P in the form of a magnetic north pole being shown by way of example. Adjacent to the magnetic north pole, there follows a rotor pole P, not shown here, in the form of a magnetic south pole. The rotor 3 has a rotor iron core 8 or laminations, which has or have an outer side 9 facing the air gap 4. In addition, each rotor pole P has at least one permanent magnet 10, which is formed as a permanent magnet divided into two permanent magnet parts 10a, 10b. A first permanent magnet part 10a is arranged in a first hollow space 11 of the rotor iron core 8, and a second permanent magnet part 10b is arranged in a second hollow space 12 of the rotor iron core 8. The hollow spaces 11, 12 extend through the rotor iron core 8 in an axial direction, oriented along the axis of rotation A. The permanent magnet 10, shown divided here, together with the divided permanent magnet 10 of the other rotor pole P of the rotor 3, forms an embedded permanent magnet assembly. This embedded permanent magnet assembly produces in the air gap 4 a magnetic flux density or air gap flux density, the profile of which influences an operation of the electrical machine 1. In particular, the profile of the air gap flux density influences a magnitude and a ripple of the torque of the electrical machine 1 and power losses of the electrical machine 1.

The permanent magnet parts 10a, 10b are arranged tangentially, extending in the circumferential direction U and horizontally next to one another, and have a magnetization oriented along the radial direction R. The permanent magnet parts 10a, 10b here additionally have a convex surface 13 curved in the direction of the air gap 4. This convex surface 13 can benefit a sinusoidal profile of the air gap flux density in the air gap 4. With a tangential arrangement of the permanent magnet parts 10a, 10b, it must be ensured that the rotor iron core 8 is also sufficiently stable at higher rotational speeds of the electrical machine 1 in order to support the permanent magnet parts 10a, 10b appropriately and to prevent breakage of the permanent magnet parts 10a, 10b. Therefore, a crosspiece 14 extending in the radial direction R is arranged in the circumferential direction U between the permanent magnet parts 10a, 10b, which crosspiece has support sections 15 which increase mechanical stability and stiffness of the rotor iron core 8. The support sections 15 are formed from rotor iron core material and are therefore magnetically conductive. By way of these magnetically conductive support sections 15, external magnetic field strengths in the event of a short circuit actively caused in the electrical machine 1 can be led past the permanent magnet parts 10a, 10b and therefore discharged. The support sections 15 can therefore prevent the permanent magnet parts 10a, 10b from being de-magnetized by the external magnetic fluxes during the active short circuit.

In addition, the crosspiece 14 has magnetic flux-blocking sections 16, which penetrate the rotor iron core material in the axial direction and which are magnetically insulating. By way of the magnetically insulating flux-blocking sections 16, which here are formed as cavities in the rotor iron core 8, magnetic leakage fluxes which occur at the edges of the permanent magnet parts 10a, 10b can be reduced. This is because these magnetically insulating flux-blocking sections 16 form barriers for magnetic leakage fluxes and thus control the latter specifically, which means that a higher magnetic flux density is available in the air gap 4 for the electromechanical conversion. By way of the magnetic flux-blocking sections 16 between the permanent magnet parts 10a, 10b, the magnetic flux density in this crosspiece 14 can firstly be specifically focused and secondly distributed beneficially. Here, the cavities are arranged equidistant from one another and all have the same shape. In summary, by way of a defined configuration of a structure of mechanical support sections 15 and magnetic flux-blocking sections 16 between the permanent magnet parts 10a, 10b, both the mechanical force flow and the magnetic fluxes can be controlled and optimized specifically to the need.

LIST OF DESIGNATIONS

1 Electrical machine
2 Stator
3 Rotor
4 Air gap
5 Stator laminations
6 Grooves
7 Windings
8 Rotor iron core
9 Outer side
10 Permanent magnet
10a, 10b Permanent magnet parts
11 First hollow space
12 Second hollow space
13 Surface
14 Crosspiece
15 Support sections
16 Flux-blocking sections
R Radial direction
U Circumferential direction
A Axis of rotation

What is claimed is:

1. A rotor for a permanently energized electrical machine, the rotor comprising:
   at least two rotor poles arranged next to one another in a circumferential direction;
   a rotor iron core;
   a permanent magnet assembly embedded in the rotor iron core for producing a magnetic air gap flux density in an air gap of the electrical machine which adjoins an outer side of the rotor iron core, wherein the permanent magnet assembly has at least one permanent magnet per rotor pole, and each permanent magnet is divided into two permanent magnet parts; and
   a crosspiece between the two permanent magnet parts, wherein the crosspiece:
      separates two hollow spaces for receiving the permanent magnet parts,
      has magnetically conductive support sections for increasing mechanical stiffness of the rotor iron core and for discharging external magnetic fluxes in an event of an active short-circuit introduced into the electrical machine, and
      has magnetically insulating flux-blocking sections for reducing magnetic leakage fluxes,
   wherein adjacent sides of the two permanent magnetic parts that face each other are oriented parallel to each other,
   wherein each of the two permanent magnetic parts includes a surface that is perpendicular to a radial direction, and
   wherein the flux-blocking sections are arranged at a distance from one another in the radial direction, so that the flux-blocking sections and the support sections are arranged alternately in the radial direction in the crosspiece.

2. The rotor according to claim 1, wherein a magnetization direction of the two permanent magnet parts is oriented at right angles to a magnetic longitudinal axis.

3. The rotor according to claim 1, wherein:
   surfaces of the permanent magnet parts which face the outer side of the rotor iron core are curved convexly, and
   each of the hollow spaces has a concavely curved inner side corresponding to a respective one of the convexly curved surfaces.

4. The rotor according to claim 1, wherein:
   the flux-blocking sections are formed as cavities in the rotor iron core, and
   the support sections are formed as rotor iron core material adjacent to the cavities.

5. The rotor according to claim 4, wherein the cavities are filled with electrically and magnetically insulating supporting material to further increase the mechanical stiffness of the rotor iron core.

6. A permanently energized electrical machine comprising:
   a stator; and
   a rotor that is rotatably mounted with respect to the stator; wherein:
   an air gap is formed between the rotor and the stator, and
   the rotor comprises:
      at least two rotor poles arranged next to one another in a circumferential direction;
      a rotor iron core;
      a permanent magnet assembly embedded in the rotor iron core for producing a magnetic air gap flux density in an air gap of the electrical machine which adjoins an outer side of the rotor iron core, wherein the permanent magnet assembly has at least one permanent magnet per rotor pole, and each permanent magnet is divided into two permanent magnet parts; and
   a crosspiece between the two permanent magnet parts, wherein the crosspiece:
      separates two hollow spaces for receiving the permanent magnet parts,
      has magnetically conductive support sections for increasing mechanical stiffness of the rotor iron core and for discharging external magnetic fluxes in an event of an active short-circuit introduced into the electrical machine, and
      has magnetically insulating flux-blocking sections for reducing magnetic leakage fluxes,
   wherein adjacent sides of the two permanent magnetic parts that face each other are oriented parallel to each other,
   wherein each of the two permanent magnetic parts includes a surface that is perpendicular to a radial direction, and
   wherein the flux-blocking sections are arranged at a distance from one another in the radial direction, so that the flux-blocking sections and the support sections are arranged alternately in the radial direction in the crosspiece.

7. A motor vehicle comprising the permanently energized electrical machine according to claim 6.

8. A rotor for a permanently energized electrical machine, the rotor comprising:
   at least two rotor poles arranged next to one another in a circumferential direction;
   a rotor iron core;
   a permanent magnet assembly embedded in the rotor iron core for producing a magnetic air gap flux density in an air gap of the electrical machine which adjoins an outer side of the rotor iron core, wherein the permanent magnet assembly has at least one permanent magnet per rotor pole, and each permanent magnet is divided into two permanent magnet parts; and a crosspiece between the two permanent magnet parts, wherein the crosspiece:
  separates two hollow spaces for receiving the permanent magnet parts,
  has magnetically conductive support sections for increasing mechanical stiffness of the rotor iron core and for discharging external magnetic fluxes in an event of an active short-circuit introduced into the electrical machine, and
  has magnetically insulating flux-blocking sections for reducing magnetic leakage fluxes,
wherein adjacent sides of the two permanent magnetic parts that face each other are oriented parallel to each other,
wherein each of the two permanent magnetic parts includes a surface that is perpendicular to a radial direction,
wherein surfaces of the permanent magnet parts which face the outer side of the rotor iron core are curved convexly, and
wherein each of the hollow spaces has a concavely curved inner side corresponding to a respective one of the convexly curved surfaces.

\* \* \* \* \*